(12) United States Patent  
Keuper (10) Patent No.: US 8,956,032 B2  
(45) Date of Patent: Feb. 17, 2015

(54) LED LIGHTING SYSTEM COMPRISING AN OPTICAL SYSTEM SUITABLE FOR PROVIDING A LIGHT BEAM

(75) Inventor: Matthijs Hendrik Keuper, Geldrop (NL)

(73) Assignee: Invisua Holding B.V., Geldrop (NL)

( * ) Notice: Subject to any disclaimer, the term of this patent is extended or adjusted under 35 U.S.C. 154(b) by 40 days.

(21) Appl. No.: 13/824,002

(22) PCT Filed: Sep. 17, 2010

(86) PCT No.: PCT/NL2010/050600  
§ 371 (c)(1),  
(2), (4) Date: Mar. 15, 2013

(87) PCT Pub. No.: WO2012/036541  
PCT Pub. Date: Mar. 22, 2012

(65) Prior Publication Data  
US 2013/0188387 A1  Jul. 25, 2013

(51) Int. Cl.  
*F21V 7/04* (2006.01)  
*F21V 8/00* (2006.01)  
(Continued)

(52) U.S. Cl.  
CPC .............. *G02B 6/0008* (2013.01); *F21V 29/22* (2013.01); *F21S 2/00* (2013.01); *F21V 7/0033* (2013.01); *F21V 21/26* (2013.01); *F21V 2008/002* (2013.01); *F21W 2131/406* (2013.01); *F21Y 2101/02* (2013.01); *F21Y 2113/005* (2013.01); *G02B 6/0006* (2013.01); *G02B 6/0021* (2013.01); *F21V 29/006* (2013.01); *F21S 8/04* (2013.01)  
USPC ........................ 362/555; 362/558; 362/311.02

(58) Field of Classification Search  
USPC .............................. 362/555, 558, 232, 311.02  
See application file for complete search history.

(56) References Cited

U.S. PATENT DOCUMENTS

2005/0084229 A1*  4/2005  Babbitt et al. ................ 385/146  
2005/0152141 A1   7/2005  Suzuki  
(Continued)

OTHER PUBLICATIONS

International Search Report for PCT/NL2010/050600, mailed Jun. 29, 2011.

(Continued)

*Primary Examiner* — Mary Ellen Bowman  
(74) *Attorney, Agent, or Firm* — Nixon & Vanderhye P.C.

(57) ABSTRACT

An optical system having a light guide (3) and a reflector (6) is described. The light guide transports, during use, light from a first end (30) to a second end (31) of the light guide. The light guide has an entrance surface (2) at the first end for allowing incident light to enter the light guide at an entrance axis (8). The light guide further has a coupling element (5) at the second end for coupling light out of the light guide at a coupling axis (9) for illuminating the reflector. The light guide further has a solid rod-like guiding section (32) for guiding light entered in the light guide from the first end to the coupling element. The rod-like guiding section has one or more bends (33,34). Each light ray of the light guided to the coupling element is reflected in the bend (s) one or more times. The reflector receives light coupled out of the light guide and reflects the received light for providing a directed beam at a beam axis (9).

20 Claims, 8 Drawing Sheets (51) Int. Cl.
*F21V 29/00* (2006.01)
*F21S 2/00* (2006.01)
*F21V 7/00* (2006.01)
*F21V 21/26* (2006.01)
*F21W 131/406* (2006.01)
*F21Y 101/02* (2006.01)
*F21Y 113/00* (2006.01)
*F21S 8/04* (2006.01)

(56) References Cited

U.S. PATENT DOCUMENTS

2005/0207177 A1 9/2005 Guy
2008/0210953 A1 9/2008 Ladstatter et al.
2008/0239725 A1 10/2008 Ishikura et al.

OTHER PUBLICATIONS

Written Opinion for PCT/NL2010/050600, mailed Jun. 29, 2011.

* cited by examiner

LED LIGHTING SYSTEM COMPRISING AN OPTICAL SYSTEM SUITABLE FOR PROVIDING A LIGHT BEAM

This application is the U.S. national phase of International Application No. PCT/NL2010/050600 filed 17 Sep. 2010 which designated the U.S., the entire content of which is hereby incorporated by reference.

FIELD

The invention relates to an optical system for a LED lighting system. The invention further relates to a LED lighting system comprising such an optical system. The invention further relates to a method of providing a light beam using such LED lighting system.

BACKGROUND

LED lighting systems are becoming more and more popular. LED lighting systems may in particular be used in situations where a user wants to be able to control and change the color of a light beam provided by the LED lighting system, for example in applications as spot lighting, shop lighting, stage lighting or architectural lighting. For that purpose, a LED lighting system may be used comprising a plurality of LED diodes which generate light of different colors, such as a red LED, a green LED and a blue LED. The light of the plurality of LEDs then needs to be combined to create a single beam of the color required by the user. This combining is usually referred to as color mixing. Various methods of color mixing and devices for color mixing are known in the art. However, these known methods of color mixing may have disadvantages, such as efficiency losses, non-optimal color mixing, or a poor compatibility with other requirements, such as e.g. a control of beam direction.

LED lighting systems may also face other difficulties in design or use. For example, LED lighting systems typically require a heat sink to transfer heat away from the LED diodes during use. These requirements may especially be severe in applications where a large amount of light is required, such as stage lighting. An optimal effect of a heat sink may require operating conditions which conflict with other requirements. E.g., the dissipation of heat by convection associated with such heat sink may require forced air cooling using a fan, which may not be desirable due to e.g. the noise produced by the fan or the risk of failure of such fan. Also, it may be required to maintain the heat sink in an orientation wherein the convection is optimal, e.g. with fins, in use, remaining vertically oriented for optimal cooling capacity, which may conflict with the desire of a user to orient the LED lighting system such that the light beam is in a required direction. The user may e.g. experience that the performance of the LED lighting system will vary with beam direction.

The invention aims to provide a novel LED lighting system which preferably at least partly obviates one or more of the above-described drawbacks, and which may further preferably fulfill one or more of the above indicated desires.

SUMMARY

Hereto, according to a first aspect, the invention provides an optical system comprising a light guide and a reflector,
a) the light guide being arranged for transporting light from a first end to a second end of the light guide, the light guide comprising:

an entrance surface arranged at the first end for allowing incident light to enter the light guide at an entrance axis,
a coupling element arranged at the second end for coupling light out of the light guide at a coupling axis for illuminating the reflector, and
a rod-like guiding section for guiding at least part of the light entered in the light guide from the first end to the coupling element,
the rod-like guiding section having at least one bend arranged such that each light ray of the light guided to the coupling element is reflected at least once in the at least one bend; and
b) the reflector being arranged to receive at least part of the light coupled out of the light guide and to reflect the received light for providing a directed beam at a beam axis.

The rod-like guiding section may be solid. The rod-like guiding section may be rigid. The rod-like guiding section may be substantially rigid with some small degree of flexibility, e.g. made of silicone, which may e.g. provide a slightly deformable rod-like guiding section. The entrance surface may be arranged at the first end for allowing incident light provided, during use, from at least two LED diodes of a LED light source, to enter the light source. The optical system may be arranged to receive light from one or more LEDs at the entrance surface, e.g. from a plurality of LEDs of different color. The optical system may in particular be arranged to receive light from at least two LEDs at the entrance surface. The optical system may be arranged such that at least part, and preferably substantially all, light of the received light is entering the light guide and is being guided by the rod-like guiding section from the first end to the coupling element arranged at the second end. The guided light may be reflected inside the light guide by total internal reflection, whereby the light may be transported very efficiently through the light guide. The at least one bend may be arranged such that each light ray of the light guided to the coupling element is reflected at least once in the at least one bend. Thus, the at least one bend in the guiding-section may be arranged such that substantially all light rays, i.e. at any angle relative to the entrance axis, reflect at least once inside the rod-like guiding section. This may result in an increased degree of light mixing compared to known systems. In particular, the guiding section with the at least one bend may be advantageous compared to a known mixing device wherein a straight mixing rod is used: such known mixing devices have the disadvantage that a fraction of the entered light is transported through the straight mixing rod without any reflection, so-called direct light rays. Thus, in the known mixing device using a straight mixing rod, part of the light rays are guided without any reflection inside the straight mixing rod. Such direct light rays may result in a very poor mixing, in particular in the center of the beam.

The coupling element at the end of the light guide and the reflector are arranged to cooperate to provide a light beam with a particular shape defined by the design of the coupling element and the reflector, and a direction defined by the coupling axis and the design of the coupling element and the reflector. The reflector may have a reflector axis substantially corresponding to the coupling axis, which may e.g. be advantageous for obtaining a substantially symmetrical beam shape. In particular, the reflector axis and the coupling axis may substantially coincide with each other and with the beam axis. The light beam may thus be formed as a directed beam in the direction of the beam axis. The reflector may e.g. be a substantially parabolic reflector and the coupling element may be arranged such that the light rays coupled out of the coupling element to the reflector appear to substantially originate from a focal point of the parabolic reflector to provide a substantially parallel directed beam, or, alternatively, from a predetermined or adjustable point on the reflector axis at a different position than the position of the focal point, to provide a directed beam with a corresponding predetermined or adjustable degree of divergence.

In an embodiment, the at least one bend is arranged to orient the beam axis at an angle relative to the entrance axis. The light beam may thus be formed as a directed beam in the direction of the beam axis at an angle relative to the entrance axis. The light beam axis may thus be directed differently than the entrance axis. This may e.g. be advantageous in situations where the orientation of the entrance axis is subject to boundary conditions on the orientation of e.g. the light source which provides light to the optical system, which would restrict the possible directions of the light beam. E.g., the boundary conditions may require that a LED light source equipped with a heat sink with fins has to be oriented such that the fins are, in use, vertically oriented, whereby the LED light source provides an input beam to the optical system with an input beam axis which is, in use, in the horizontal plane, which may require the entrance axis to be, in use, in the horizontal plane. Without the at least one bend, the directed beam would then also be in the horizontal plane when the boundary conditions are respected.

In an embodiment, the angle is larger than 30 degree, preferably larger than 45 degrees and more preferably larger than 60 degrees. Such angles may result in an improved light mixing, as angles in these ranges may be associated with a substantial absence of direct light rays. Also, such angles may be advantageous in the range of possible beam directions, when the optical system is arranged such that it is rotatable with two degrees of freedom.

In an embodiment, the angle is substantially 90 degrees. An angle of 90 degrees may be particularly advantageous when the optical system is arranged such that it is rotatable with two degrees of freedom, as the directed beam may then be directed in substantially any direction. In particular, when the entrance axis is arranged in the horizontal plane, and the optical system is rotatable about the, horizontal, entrance axis and about a vertical axis, the optical system may be arranged to provide the directed beam in substantially any desired direction. The optical system may thus be advantageously used in lighting systems wherein the light beam direction is adjustable, such as spot lighting, shop lighting, architectural lighting or stage lighting.

In an embodiment, the rod-like guiding section has at least two bends, the two bends being in opposite directions in a single plane. The inventor has found that using more than one bend may be advantageous in designing the light guide. At least two bends may e.g. improve the beam symmetry of the light beam compared to a light guide with one bend. Using at least two bends may also be advantageous for other reasons, e.g. for aesthetical reasons In an embodiment, the light guide is integrally formed. Thus, the guiding section and coupling element are formed as a single piece, e.g. from injection moulding. This may be advantageous in terms of the efficiency of transport of light through the light guide, due to the absence of optical interfaces inside the light guide. Alternatively or additionally, it may be advantageous in terms of mechanical robustness, in terms of cost and/or in terms of the number of parts.

In an alternative embodiment, the guiding section and the coupling element are individual components, wherein the coupling element is in optical communication with the guiding section. In particular, the coupling element may be glued or otherwise mounted/connected to the guiding section. This may e.g. advantageously allow to assemble a variety of light guides with different characteristics to suit different use requirements from a variety of pre-fabricated guiding sections and a variety of pre-fabricated coupling elements.

In an embodiment, the reflector is removably provided in the optical system. This may allow to replace the reflector by a different reflector, e.g. designed to provide a different beam shape, such as a different beam width of different beam convergence. Thereby, only the reflector would have to be exchanged in order to achieve a different beam shape.

In an embodiment, the reflector is movable relative to the coupling element. This may allow to easily change beam shape, e.g. beam convergence, whereby the optical system may be versatilly applicable.

In an embodiment, the coupling element comprises a reflective surface and a transmissive surface, the reflective surface being arranged to reflect guided light inside the coupling element towards the transmissive surface, and the transmissive surface being arranged to transmit the reflected light out of the coupling element. Hereby, a coupling element may be provided that efficiently couples out light to illuminate the reflector. The reflective surface may be formed by a reflective coating on the element. Alternatively, a separate component may be glued on the element with a low refractive index material in between, or attached to it with a thin air layer in between, to reflect the guided light using total internal reflection towards the transmissive surface. The reflective surface could be structured to further improve color mixing. The transmissive surface could be textured or structured to further improve color mixing. The transmissive surface may be coated with an anti-reflective coating to improve the efficiency. Herein, the term "reflect" relates to reflecting, during use, at least 75%, preferably at least 90%, and even more preferably at least 95%, of the guided light received by the reflective surface. Herein, the term "transmit" relates to transmitting, during use, at least 75%, preferably at least 90%, and even more preferably at least 95%, of the light received by the transmissible surface after having been reflected by the reflective surface.

In a further embodiment, the coupling element comprises a tapered sidewall with increasing cross-sectional dimension along a downstream direction from the guiding section towards the reflective surface, the sidewall comprising the transmissive surface. This may be advantageous in terms of efficiency of coupling light out of the light guide to illuminate the reflector. In particular, the tapered sidewall may allow the reflector to have practical dimensions while capturing substantially all transmitted light: another shape of sidewall, e.g. a cylindrical sidewall, may however have the effect that a significant fraction of light is emitted from the transmissive surface outside the capture range of the reflector, and/or would require a reflector with a very large depth. The tapered sidewall may be frusto-conical, with a linearly increasing diameter along its length. The tapered sidewall may have a concave or convex curvature along the downstream direction, which may further improve the system performance.

In an embodiment, the coupling element comprises an inwardly tapered depression with decreasing cross-sectional dimension along an upstream direction towards the guiding section, the depression comprising the reflective surface. The inwardly tapered depression may be provided in a downstream end surface of the coupling element. Such inwardly tapered depression may be advantageous in terms of efficiency of directing light in the direction of the transmissive surface. The shape of the inwardly tapered depression may be designed together with the shape of the side wall to obtain a specific illumination pattern of the reflector, which, together with the design of the reflector, defines the shape of the directed beam provided, during use, by the optical system.

In a further embodiment, the depression is provided as an interior cone in the coupling element. The term "interior cone" relates to a cone having its base at a downstream end surface of the coupling element and having its tip inside the coupling element. With such interior cone, designing the specific illumination pattern may be facilitated, as the design of the reflective surface may then be simplified to optimizing substantially only the angle of the conical surface of the interior cone relative to the coupling axis. The angle of the conical surface relative to the coupling axis, measured in a longitudinal section, may e.g. be in the range of 30-75 degrees, which may correspond to an opening angle of the cone in the range of 60-150 degrees. The angle of the conical surface relative to the coupling axis may e.g. be in the range of 30-65 degrees, 40-65 degrees, 40-75 degrees.

In an embodiment, the coupling element is provided with an externally protruding flange. The flange may facilitate mounting and handling. The flange preferably has no optical functionality, but is designed such that it does not interfere with the optical performance.

In an embodiment, the guiding section has a substantially circular or elliptical cross-section. Such a cross-section may be advantageous in mixing light into a beam with a smooth intensity distribution across its cross-section.

In an embodiment, the guiding section has a cross-section comprising corners, preferably a square, rectangular, or hexagonal cross section. The corners may result in an improved color mixing.

In further embodiments, the guiding section has a first cross-section at a first position along its length and a second cross-section at a second position along its length, the second position being different from the first position and the second cross-section being different from the first cross-section. The cross-sections may be different e.g. in size (area) and/or shape. The guiding section may e.g. have a substantially square cross-section at the first end near the entrance surface, and gradually change towards a circular cross-section near the coupling element.

According to a second aspect, the invention provides a LED lighting system comprising a LED light source and an optical system according to any one of the preceding claims, wherein the LED light source is arranged to provide the incident light to the entrance surface. As will be understood from the discussion above, such LED light system may have an improved light mixing performance compared to known LED lighting systems, wherein e.g. a straight mixing rod is used.

According to an embodiment of the LED lighting system, the optical system is rotatable about the entrance axis. This allows to change the direction of the directed beam with a first degree of freedom. E.g., when a LED lighting system, wherein the angle between entrance axis and light beam axis is 90 degrees, is mounted suspended from a ceiling, the entrance axis may be in the horizontal plane, and the optical system may be rotatable about the horizontal axis, whereby the light beam may be rotated in a vertical plane. The entrance axis may be referred to below as the "light guide rotation axis". In an embodiment, the optical system is rotatable relative to the LED light source. In an alternative embodiment, the optical system and LED light source are together rotatable relative to a common mount.

In an embodiment, the LED light source and the optical system are together rotatable about a system rotation axis, the system rotation axis being at an angle to the entrance axis. This allows to change the direction of the directed beam with a second degree of freedom. E.g., a LED lighting system, wherein the angle between entrance axis and light beam axis is 90 degrees, may be mounted suspended from a ceiling and rotatable about a vertical axis, e.g., about a suspension unit. The entrance axis is then rotatable in the horizontal plane.

When the optical system is rotatable about the entrance axis and the LED light source and the optical system are together rotatable about a system rotation axis with the system rotation axis being at an angle to the entrance axis, the direction of the directed beam may thus be changed, or defined, with two degrees of freedom.

In an embodiment, the LED lighting system further comprises a heat sink in thermal communication with the LED light source for conducting heat away from the LED light source during use. This addresses the problem of heat dissipation by the LED light source. Especially in applications that require a relatively large amount of light, such as spot lighting for shops or stage lighting, a large amount of heat is dissipated. In contrast to conventional lamps, where heat is radiated, LEDs need to dissipate this heat by convection, which means a heat sink is required in order to keep the LEDS at their desired operating temperature. The heat sink may therefore be arranged to transfer heat away into the environment during operation of the LED light source. The heat sink is e.g. arranged to transfer heat from heat sink fins provided at the heat sink surface to the surrounding air which is maintained in circulation by (natural or forced) convection. Instead of air, a liquid could be used to take away the heat.

In an embodiment, the heat sink is positioned at a distance from the LED light source for radiating the heat away, and the LED lighting system further comprises a heat pipe for conducting the heat from the LED light source to the heat sink. This allows e.g. the LED lighting system to be a slim-design LED luminaire with a relatively large heat sink; a bulky heat sink body with heat sink fins may be provided at a distance from the LED light source, with a relatively slim and elegant heat pipe extending from the LED light source to the heat sink body. Hereby, a large freedom in design of the visible part of the luminaire may be obtained. Also, the heat sink could e.g. be hidden, for example behind a suspended ceiling.

In an embodiment the heat sink is designed to be oriented in a predetermined orientation during use and to maintain the predetermined orientation during rotation of the optical system.

The heat sink may be rotatable together with the LED light source and the optical system about the system axis. In particular, the predetermined orientation may be an upright orientation, and may the heat sink rotate about a vertical axis, whereby the upright rotation of the heat sink is maintained. This may be advantageous in maintaining a good cooling capacity by the heat sink. E.g., a heat sink with, in use, vertically oriented fins has a better cooling capacity than a heat sink with, in use, horizontally oriented fins, as heated air will rise up and cause a natural flow through the fins. According to the embodiment of the invention, the vertical orientation of the fins, in use, is maintained, and thereby the high cooling capacity.

The LED light source may comprise a plurality of LED diodes, distributed over one or more LED packages. The plurality of LED diodes may comprise LED diodes of at least two different colors. The plurality of LED diodes may be operated with a controllable brightness, in particular to control and/or change the relative intensity of light delivered by the LED diodes. E.g., two colors may be provided such as a white LED and a blue LED, allowing to change the color of the combined beam between various colors of whites (e.g., from so-called cool-white to so-called warm-white). Alternatively, e.g. three colors may be provided such as a red, green, and blue LEDs, allowing to set and/or change a wide variety of colors. Also, a fourth color may be provided, e.g. a yellowish LED in addition to a red, green and blue LED, or an additional white LED. The different colors of the different LED diodes may be mixed with a good color mixing performance in the system according to the invention. In alternative embodiments, the plurality of LED diodes may all have substantially the same color. Also for embodiments where the plurality of LED diodes all have substantially the same color, the light of the LEDs diodes may be mixed with a good mixing performance in the system according to the invention, whereby slight differences in color and/or differences in brightness between the different LEDs are averaged out.

In an embodiment, the LED light source comprises a LED package comprising a plurality of LED diodes. The LED light source may comprise only one LED package comprising a plurality of LED diodes. Alternatively, the LED light source may comprise a plurality of LED packages, each comprising one LED diode. Alternatively, the LED light source may comprises a plurality of LED packages, each comprising a plurality of LED diodes. The optical system according to the invention may mix the light generated, during use, by the plurality of LED diodes, and thereby result in a directed light beam with a substantially uniform color.

The optical system according to embodiments of the invention may also be suitable for use with a single LED diode, such as a single, high power LED. Especially in embodiments wherein the heat sink remains, during use, in a predetermined orientation (especially remaining upright during rotation) may the optical system advantageously be used also with a single LED, and thereby maintain the cooling capacity in any rotational position.

According to a further aspect, the invention provides a stage lighting system comprising at least one LED lighting system according to one of the embodiments described above, and the use of at least one LED lighting system according to one of the embodiments described above, as stage lighting. Hereby, at least part of a stage may be illuminated with a beam with well-mixed colors that may, in embodiments, further be controlled in direction and/or shape.

According to another further aspect, the invention provides a shop lighting system comprising at least one LED lighting system according to one of the embodiments described above, and the use of at least one LED lighting system according to one of the embodiments described above, as shop lighting. Hereby, at least part of a shop, e.g. an exhibit of an article on sale, may be illuminated with a beam with well-mixed colors that may, in embodiments, further be controlled in direction and/or shape.

According to again another further aspect, the invention provides a coupling element suitable for coupling guided light out of a light guide section to a reflector, the coupling element comprising a reflective surface and a transmissive surface, the coupling element being capable of during use, receiving guided light from the light guide section, the reflective surface being arranged to reflect at least part of the guided light inside the coupling element towards the transmissive surface, and the transmissive surface being arranged to transmit at least part of the reflected light out of the coupling element towards the reflector.

Such coupling element may be used in cooperation or as part of a light guide having at least one bend. Such coupling element may alternatively be used in cooperation or as part of a straight light guide, and cooperate with a reflector to be capable of providing a light beam of a predetermined shape by a suitable design of the coupling element and the reflector.

According to another aspect, the invention provides a method of providing a light beam using a LED lighting system according to any one of the embodiments described above, the LED lighting system comprising a LED light source and an optical system, the method comprising operating the LED light source to provide incident light to the entrance surface of the optical system. Hereby, a good color mixing of light of the LED light source is obtained, as will be clear from the description above.

In an embodiment, the method further comprises rotatably orienting the optical system about the entrance axis. Hereby, the light beam is oriented with a first degree of freedom. In a further embodiment, an upright orientation of the heat sink is maintained while rotatably orienting the optical system about the entrance axis.

In an embodiment, the method further comprises rotatably orienting the LED light source and the optical system about the system rotation axis. Hereby, the light beam is oriented with another degree of freedom. In a further embodiment, the system rotation axis is a vertical axis, and an upright orientation of the heat sink is maintained while rotating about the vertical axis.

For all aspects, embodiments may be combined to form further embodiments.

The invention will hereinafter be explained in detail with reference to several figures. The figures show forms of embodiments only, and are not intended as limitation of the inventive idea, which is determined by the appended claims. Technically equivalent solutions are deemed to fall within the scope of the claims.

DETAILED DESCRIPTION

Figure 1:
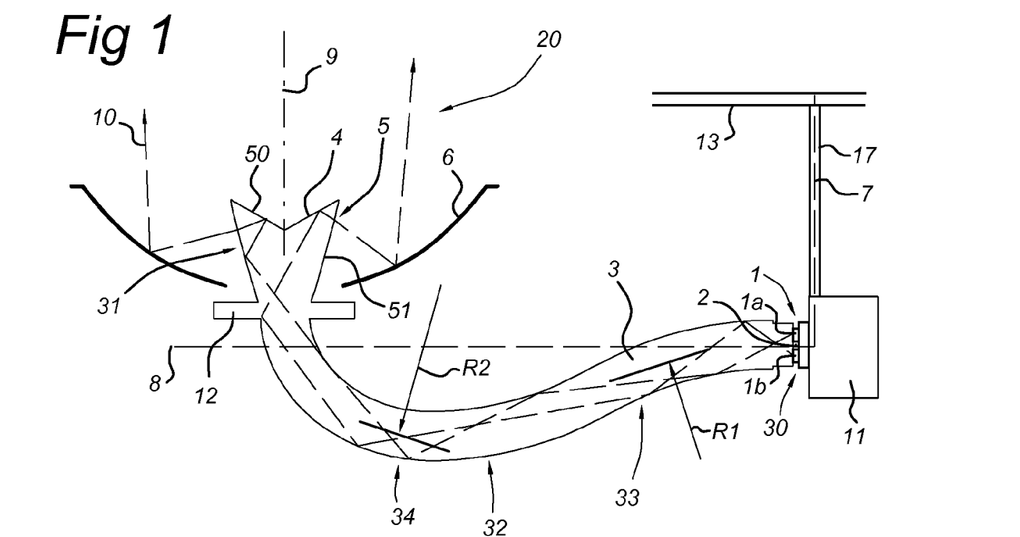
FIG. 1 schematically shows a LED lighting system according to an embodiment of the invention.

FIG. 1 schematically shows a LED lighting system according to an embodiment of the invention.

The LED lighting system comprises a LED light source 1. In the example shown, the LED light source 1 is a LED package having a plurality of LED diodes (of which two LED diodes are indicated with 1A and 1B), each capable of generating a different color of light. Examples of such LED packages are e.g. the LED devices commercially available as Luminus Devices CDM-380, Osram Ostar LE ATB S2W, CREE MCE Color, LedEngin LZC-00MD40 or Enfis Uno Plus. It will be appreciated that alternatively a single-color LED light source 1 may be used in an alternative embodiment.

The LED lighting system further comprises a light guide 3 which has a coupling element 5 integrally formed at its downstream end 31. The light guide 3, and its coupling element 5, have been integrally formed as a solid device of PMMA (=Poly(methyl methacrylate)) using injection moulding. It will be understood that other transparent materials, and other manufacturing methods, may also be used, e.g. COC (=Cyclic Olefin Copolymer), polycarbonate (PC) or glass, or other materials used for light guides now and in the future.

The light guide 3 is arranged to receive light from the plurality of LED diodes 1A, 1B of the LED light source 1 at an entrance surface 2 at its upstream end 30. An entrance axis 8 is defined at the entrance surface 2 of the light guide as the optical axis of the light guide 3 at the entrance surface 2. The entrance surface 2 may in particular be perpendicular to the light guide 3. The entrance axis 8 may correspond to a center axis of the light guide 3 at the upstream end 30. In the example shown, the entrance axis 8 coincides with the optical axis of LED light source 1. In the following, the entrance axis 8 may also be referred to as the "optical axis" of the light guide 3. The entrance surface 2 may be coated with an anti-reflective coating to improve the efficiency by which LED light is entering in the light guide 3. The part of the light guide 3 extending from the entrance surface 2 to the coupling element 5 may also be referred to in the following as the "guiding section" 32. The guiding section 32 comprises a first bend 33, in this example a 30 degree bend with a radius of curvature $R_1$ of 90 mm, and a second bend 34, in this example a 120 degree bend in the opposite direction to the first bend 33, and having a radius of curvature $R_2$ of 80 mm. The two bends together provide a total change in direction of 90 degrees from the entrance axis to a downstream end 31 of the guiding section. The guiding section 32 has a hexagonal cross-section with a diameter D of approximately 11 mm at the upstream end 30. The cross-section of the guiding section 32 changes gradually into a circular cross-section with a diameter of 11 mm at the upstream end of the coupling element 5. LED light entering the light guide 3 at the entrance surface 2 is guided using total internal reflection through the guiding section 32 towards the coupling element 5. Light with different colors, from the different LED chips of the LED light source 1, is mixed therein. The mixing may be advantageously improved when compared to known, straight mixing rods, as the bends in the guiding section 32 prevent any light rays from exiting the light guide 3 without having been reflected at least once in the guiding section 32 upon being incident on the inside wall of the guiding section: such so-called direct rays in known systems may result in a relatively poor mixing.

Figure 7A:
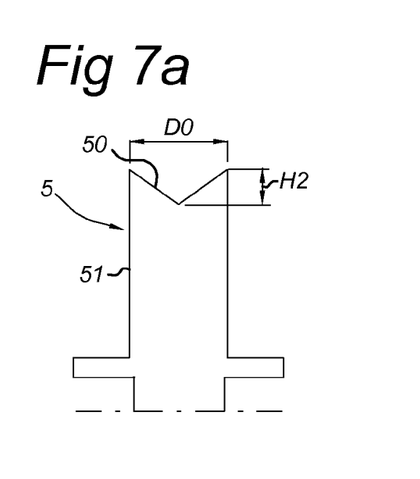
FIG. 7a-FIG. 7q schematically show examples of a coupling element suitable for embodiments of the invention and details thereof.
Figure 7B:
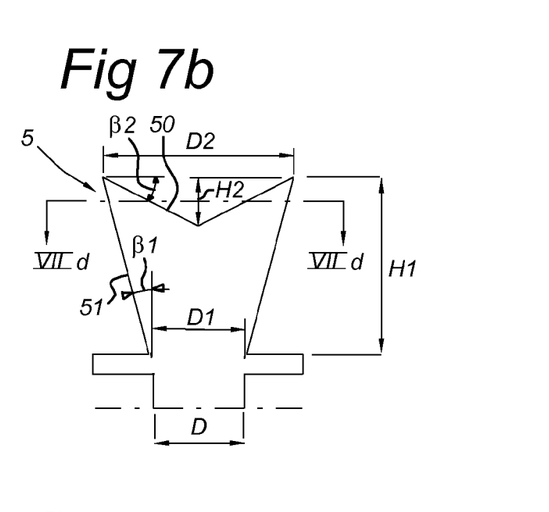
Figure 7C:
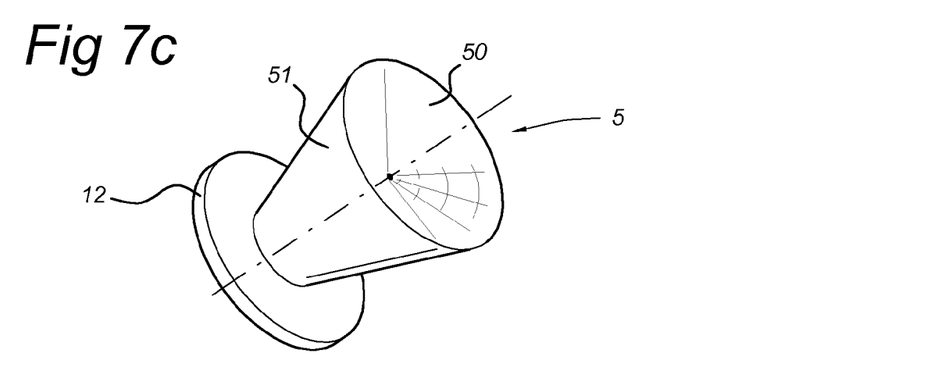

The coupling element 5 is provided at the downstream end 31 of the light guide 3 (see also FIG. 7b and FIG. 7c). The coupling element 5 has an optical axis 9 which coincides with the optical axis of the guiding section 32 at their point of contact. The optical axis 9 of the coupling element 5 may also be referred to as a coupling axis 9. The coupling element 5 comprises a reflective end surface 50 at its downstream end surface 4, provided in this exemplary embodiment as an interior cone, which receives substantially all light guided by guiding section 32 towards coupling element 5 and reflects the guided light via a transmissive surface 51 to a reflector 6. Herein, the term "interior cone" relates to a cone with its tip pointing inward into the coupling element 5. The transmissive surface 51 is shaped as a tapered sidewall of the coupling element 5 and allows the light reflected by the reflective surface 50 to leave the light guide 3 to illuminate the reflector 6. The coupling element 5 of the exemplary embodiment uses a tapered sidewall having a first diameter $D_1$ (refer to FIG. 7b) near its position of contact with the guiding section 32 of approximately $D_1=12$ mm, and a second diameter $D_2$ at its downstream end of approximately $D_2=25$ mm. The coupling element 5 has a height $H_1$ which is approximately $H_1=25$ mm, and a depth $H_2$ of the interior cone forming the reflective surface 50 which is $H_2=7$ mm. The reflector 6 has a diameter of 110 mm and a height of 35 mm. The coupling element 5 is thus arranged to reflect substantially all light to the reflector 6. Other embodiments may also be envisaged, with a differently shaped reflective surface and/or a differently shaped transmissive surface, as will be illustrated further below.

The reflective surface 50 comprises a reflective coating (not shown) in the example of FIG. 1. The reflective surface 50 may alternatively comprise a layer of a low reflective index and having a suitable shape, thereby allowing to largely reflect the light using total internal reflection, which could be advantageous in terms of efficiency. The reflective surface 50 could be structured or textured in order to improve the color mixing. The transmissive surface 51 could be textured or structured, for instance with cylindrical lenses, in order to further improve the color mixing. The transmissive surface 51 can be coated with an anti-reflective coating to improve the efficiency. The shape of the coupling element 5 is designed such that the light is emitted sideways, in order to illuminate a reflector 6.

The reflector 6 is shaped to provide a beam 20 with the required beam shape. The reflector 6 is a metal reflector with a high reflectivity, for instance using a commercially available material known as Alanod Miro. Different reflector designs could be made in order to create different beam shapes. Only the reflector 6 would have to be exchanged in order to achieve a different beam angle or beam shape. The reflector 6 may therefore be detachably mounted in the LED lighting system. The reflector 6 could be structured or faceted, such as is commonly done in the industry, in order to improve the color mixing, to alter the beam shape and/or change the aesthetics of the reflector 6.

The reflector 6 and coupling element 5 could be designed such that a different beam angle or beam shape can be achieved by moving the reflector 6 with respect to the coupling element 5. In an embodiment, the reflector 6 is movable along its optical axis, which coincides with the optical axis 6 of the coupling element 5, whereby the beam shape, in particular its degree of divergence, can be changed.

The light guide 3 coupling element can be outfitted with a flange 12, in order to facilitate mounting and handling. FIG. 1 shows an example wherein the flange 12 is provided at the exterior of the light guide 3 near the position where the guiding section 32 contacts the coupling element 5. Preferably, the flange 12 has no optical functionality and is designed such that it does not interfere with the optical performance.

FIG. 1 further indicates the path of a light ray 10. The light is emitted by the LED light source 1 at an optical axis 8, enters the light guide 3 at the entrance surface 2, is reflected and mixed by the guiding section 32 of the light guide 3, reflected by the reflective surface 50 and transmitted by the transmissive surface 51 towards the reflector 6, where it is reflected into a light beam 20 which has a light beam axis which may coincide with optical axis 9.

As shown in FIG. 1, the LED lighting system further comprises a heat sink 11. The heat sink 11 is in thermal connection with the LED light source 1, and in particular with the LED chips, for transferring heat, generated by the LED chips upon generating light, away from the LED chips.

In the exemplary embodiment shown in FIG. 1, the LED light source 1, the optical system comprising the light guide 3 and the reflector 6, and the heat sink 11 are arranged to be, in use, suspended from a highly mounted element 13, such as a ceiling or a rail, via a rod 17. The rod 17 has an axis 7. In use, the orientation of the axis 7 may be vertical. Preferably, heat sink 11 is rotatably mounted about rod 17. Therefore, the LED light source 1, the optical system comprising the light guide 3 and the reflector 6, and the heat sink 11 can be jointly rotated about the axis 7, allowing to change the direction of the light beam 20, while maintaining the heat sink 11 in an upright orientation.

In an alternative embodiment, the LED lighting system is arranged to be positioned on a surface, e.g. a floor or a table surface such as a desktop. In this alternative embodiment, the LED light source 1, the optical system comprising the light guide 3 and the reflector 6, and the heat sink 11 are mounted on a post (not shown) extending from a foot (not shown). Again, the LED light source 1, the optical system comprising the light guide 3 and the reflector 6, and the heat sink 11 may be rotatable about a vertical axis 7, allowing to change the direction of the light beam 20 while maintaining the heat sink 11 in an upright orientation.

Figure 2A:
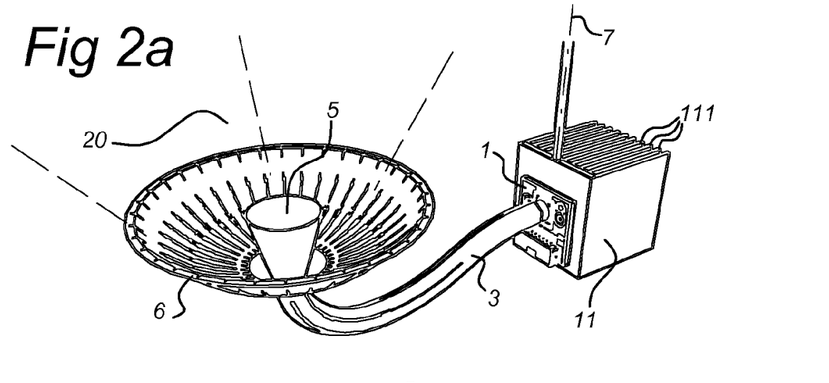
FIG. 2a-FIG. 2c schematically show a rotation of the light guide.
Figure 2B:
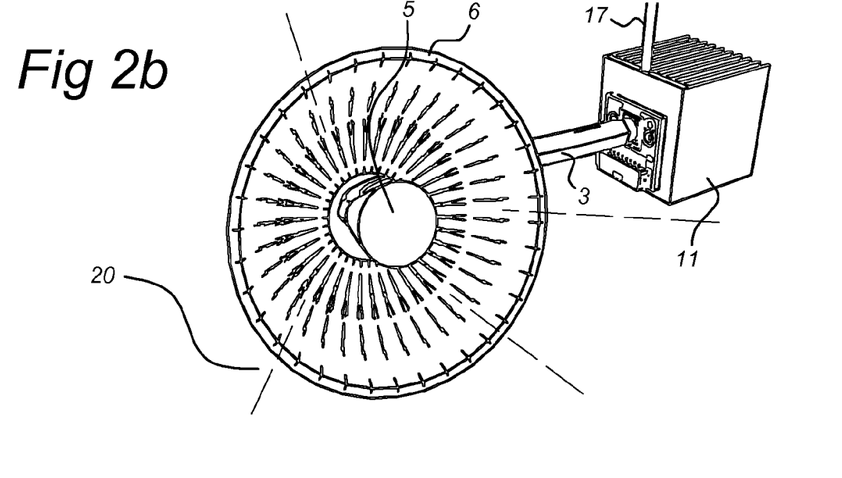
Figure 2C:
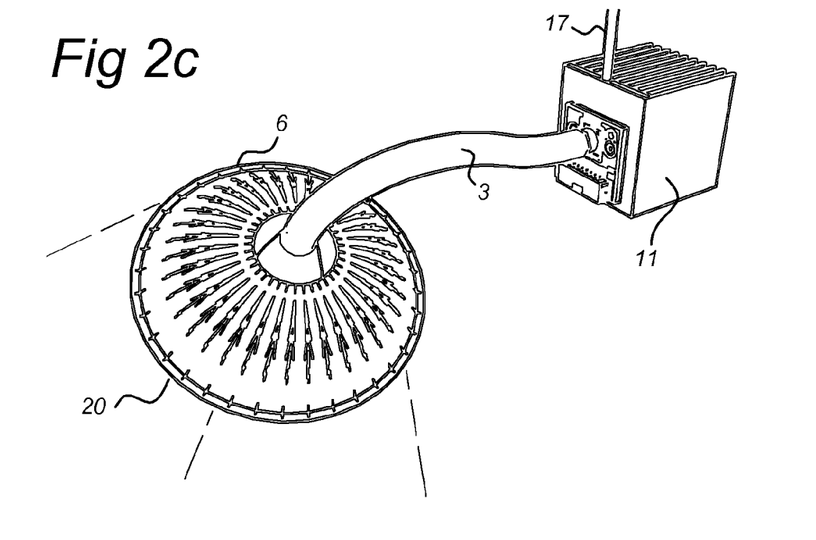

FIG. 2a-2c schematically show a rotation of the light guide 3 for changing the direction of the light beam generated by the LED lighting system. In the example shown in FIG. 2a-FIG. 2c, the LED lighting system is mounted with the optical axis 8 in the horizontal plane. The light guide 3 is rotatably mounted about the optical axis 8. As a result, rotating the optical system comprising the light guide 3 and the reflector 6 about the optical axis 8 will cause the light beam to change direction, i.e. to rotate the light beam axis 9 in a vertical plane. FIG. 2a, FIG. 2b and FIG. 2c show the LED lighting system in three different orientations. When the LED light source 1, together with the light guide 3 and the reflector 6, is also rotated about the vertical axis 7, two degrees of freedom are provided and the light beam 20 can be aimed in any direction. As the LED light source only needs to rotate about the vertical axis 7 to achieve this, the LED light source could be outfitted with a heat sink 11 with vertically mounted fins 111. Rotating the LED light source about the vertical axis 7 would then maintain the upright orientation of the heat sink 11, and thus of the fins 111, and would not change the cooling capacity. Additionally, as the heat sink 11 only needs to be able to rotate about the vertical axis 7, this may enable a large freedom of design that would not be possible otherwise.

Variations

The LED light source 1 comprises one or more LED packages, comprising one or more LED chips. The term "LED package" relates to a LED chip that is equipped with electrical supply lines, may comprise an electrical circuitry to supply and control the LED chip during use, and that may comprise some optics, e.g. optics commonly known as primary optics and/or secondary optics, to e.g. enhance the efficiency of coupling light out of the LED chip and/or to shape the generated light into a desired pattern. Embodiments may use different types of LED packages. Each LED package may comprise a plurality of LED chips of different colors within one package, or the LED chips within one LED package may all have the same colors. Alternatively, LED packages may comprise a single LED chip. It will be understood that, throughout this document and as common in the art, the term "LED chip of a certain color" relates to a LED chip which, during use, generates light of a certain color. The term "color" relates to a spectrum of the (visible) light of the light beam. The term "LED chip" may relate to the LED die itself, e.g. a LED die directly generating red light, but may also relate to the LED die with a color conversion element, e.g., a LED die generating UV light equipped with a phosphor layer for converting the generated UV into e.g. white light.

Figure 3A:
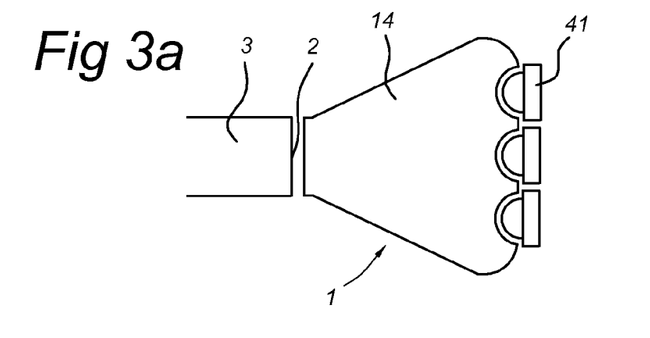
FIG. 3a-FIG. 3b schematically show alternative LED light sources for embodiments of LED lighting systems according to the invention.
Figure 3B:
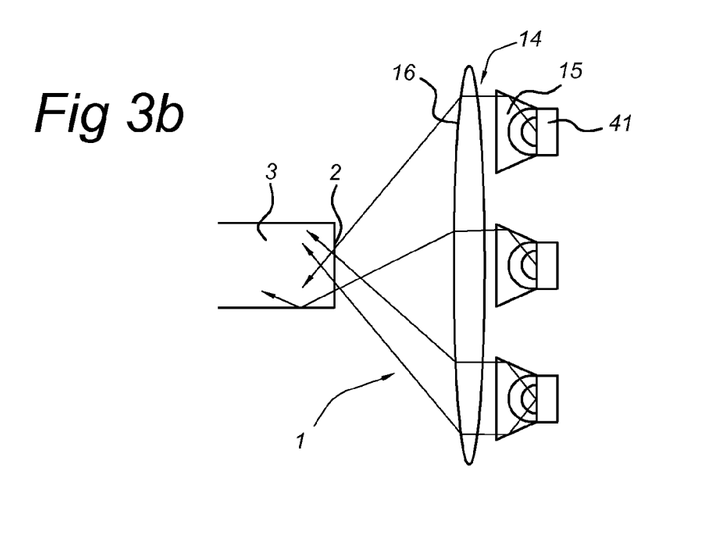

FIG. 3a and FIG. 3b show examples of alternative configurations of the LED light source 1 that can be used in LED lighting systems according to the invention.

Instead of a single LED package, an optical component 14 (FIG. 3a) or multiple optical components 14 (FIG. 3b) could be used to couple the light from multiple LED packages 41 into the same light guide 3, which would enable the use of different types of LED packages 41 and/or to increase the amount of light. The indicated drawings are just two examples of how this could be done.

FIG. 3a shows a first example of an alternative configuration of a LED light source 1. The LED light source 1 comprises a plurality of three LED packages 41, each comprising a LED package with secondary optics, and an optical component 14. The first optical component 14 is arranged to receive the light of all three LED packages 41 and guide the received light towards the entrance surface 2 of the light guide 3. The first optical component 14 may already provide some degree of color mixing of the light generated by the three LED packages.

FIG. 3b shows a second example of an alternative configuration of a LED light source 1. The LED light source 1 comprises a plurality of three LED packages 41, each comprising a LED package with secondary optics and each being provided with a collimator lens 15, and a collecting lens 16. The three collimator lenses 15 and the collecting lens 16 may be considered to form an alternative optical component 14. The collecting lens 16 is arranged to receive the light, collimated by the collimator lenses, of all three LED packages 41 and focuses the received light into the entrance surface 2 of the light guide 3. The alternative optical component 14 may already provide some degree of color mixing of the light generated by the three LED packages.

Figure 4:
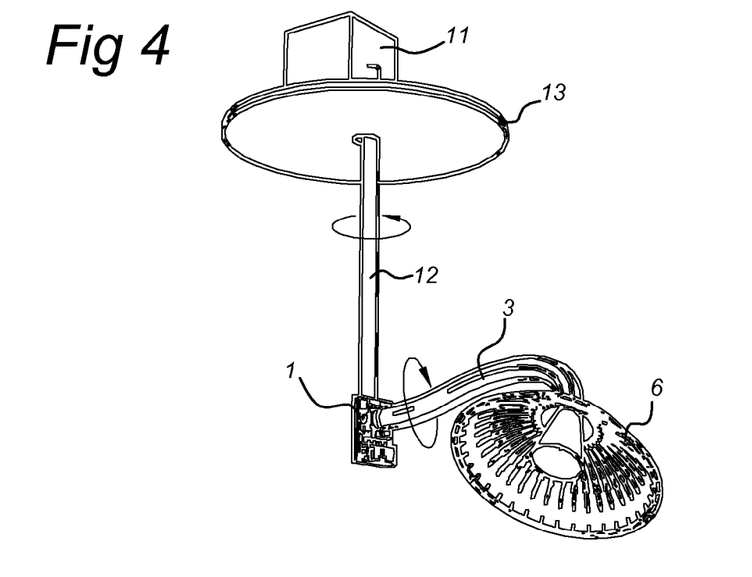
FIG. 4 shows an alternative embodiment of a LED lighting system according to the invention.

FIG. 4 shows an alternative embodiment, in which the LED lighting system is mounted under a suspended ceiling 13.

The LED lighting system uses a heat pipe 12, or liquid cooling, for cooperating with the heat sink 11 for transferring heat away from the LED light source 1. When using such a heat pipe 12, the heat sink 11 could be placed at a distance from the LED light source 1, thus providing for more freedom of design. For instance, the heat sink 11 and electronics for driving the LED light source 1 could be mounted above suspended ceiling 13, with only the LED light source 1 and optical system comprising the light guide 3 and reflector 6 protruding from the suspended ceiling 13 and being visible to the user. In this case, there are still two degrees of freedom to orient the light beam 20. This would not be possible otherwise, as normally the heat sink 11 needs to be able to rotate in two directions, which could unacceptably compromise the cooling of the LED light source 11.

When the heat sink 11 is mounted above the suspended ceiling 13, this may offer a large degree of design freedom, as the designer may be allowed to optimally design the heat sink 11 from thermal considerations only, i.e. without substantially any boundary conditions as to its aesthetical appearance. This may allow an uncompromised thermal performance.

FIG. 5a-FIG. 5e shows various light guide design variations.

Figure 5A:
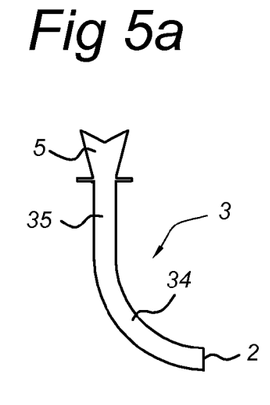
FIG. 5a-FIG. 5e schematically show examples of shapes of light guides for optical systems according to the invention.
Figure 5B:
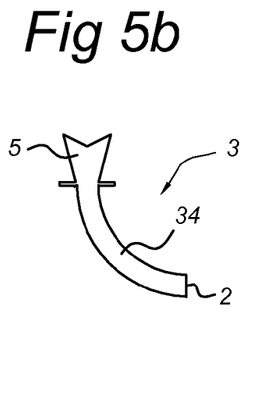

The shape of the light guide 3 could comprise a simple arc as shown in FIG. 5a and FIG. 5b, i.e. a single bend 34 with a radius of curvature. Alternatively, a more complex shape could be provided in order to achieve certain aesthetics, as shown in FIG. 5c-FIG. 5e where the guiding section 32 has two bends 33, 34.

Additionally, the length of the light guide 3 could be increased in order to improve the color mixing. FIG. 5a shows a light guide 3 with a guiding section having the same bend 34 as in FIG. 5b, but with an additional straight part 35 in between the bend 34 and the coupling element 5. FIG. 5e shows a light guide 3 with a guiding section having the same two bends 33, 34 as in FIG. 5c, but with an additional straight part 36 in between the first bend 33 and the entrance surface 2.

Figure 5C:
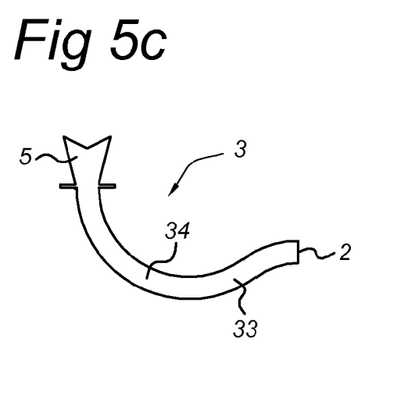
Figure 5D:
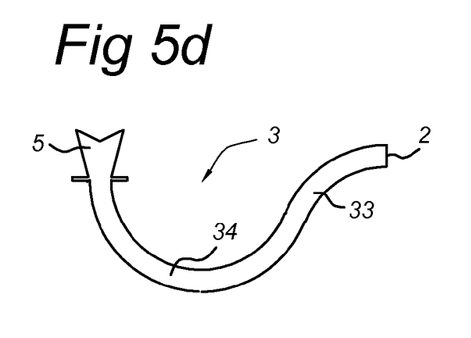
Figure 5E:
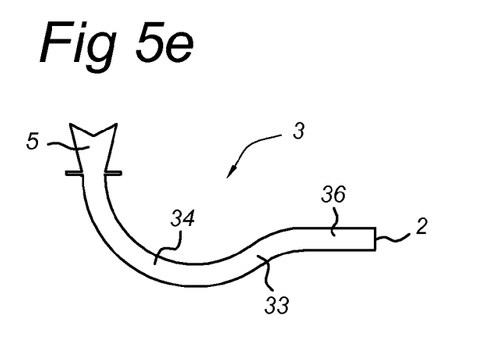

A light guide 3 which contains two bends 33, 34, such as shown in FIG. 5c, FIG. 5d and FIG. 5e may have the additional advantage that the light distribution at the end of the light guide 3 can be optimized to be more symmetric. A single bend usually results in an asymmetric light distribution at the end of the light guide. A more symmetric light distribution may be advantageous for achieving further improved color mixing performance.

Further, the bends shown are shaped as sections of a circular arc, which may be parameterized using a radius of curvature of the circular arc. Alternative shapes to form a bend may also be envisaged, such as shaped as a section of an hyperbola, a section of an ellipse, or other suitable shapes allowing guiding by total internal reflection.

Figure 6A:
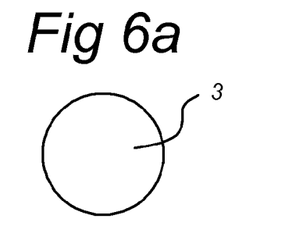
FIG. 6a-FIG. 6f schematically show examples of cross sections of light guides for optical systems according to the invention.
Figure 6B:
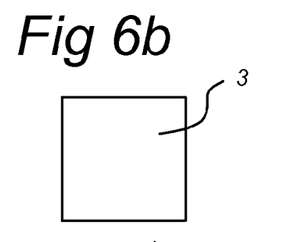
Figure 6C:
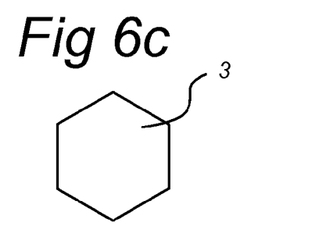
Figure 6D:
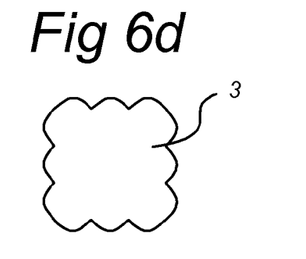
Figure 6E:
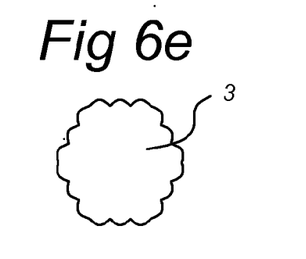
Figure 6F:
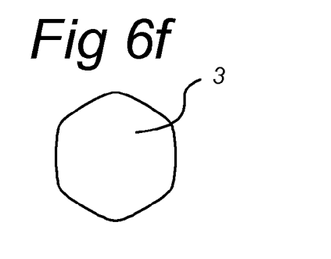

FIG. 6a-FIG. 6f shows exemplary cross-sections of the light guide 3. The cross-section could be circular (FIG. 6a), square (FIG. 6b), hexagonal (FIG. 6c), or any other shape, e.g. as schematically shown in FIG. 6d-FIG. 6f. The cross-section of the light guide 3 could change in size or shape along the length of the light guide 3. For instance, the light guide 3 could be circular at the entrance, and change to hexagonal at a certain distance. In another exemplary embodiment, the light guide 3 may have a substantially square cross-section at the first end 30 near the entrance surface 2, and gradually change towards a circular cross-section near the coupling element 5. The cross-section could also change between the guiding section 32 and the coupling element 5. A cross-section with relatively sharp corners, such as a square or hexagonal cross-section, may be advantageous in improving the color mixing compared to a smooth cross-section, such as a circular cross-section.

Figure 7D:
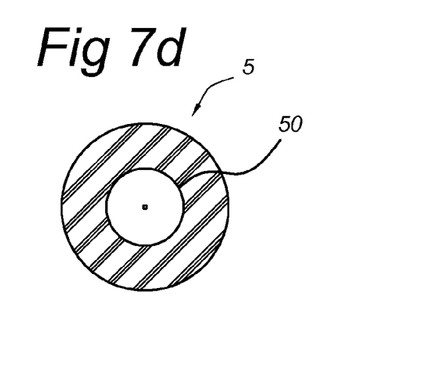
Figure 7E:
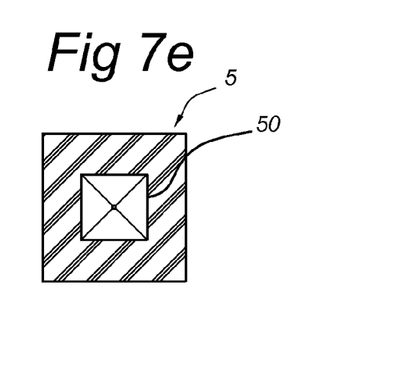
Figure 7F:
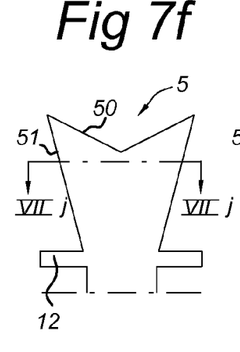
Figure 7G:
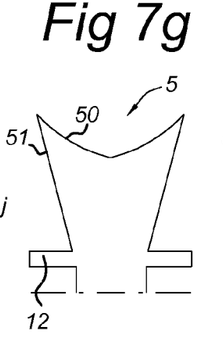
Figure 7H:
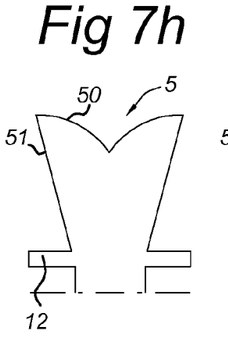
Figure 7I:
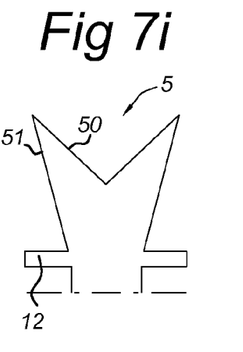
Figures 7J, 7K, 7L:
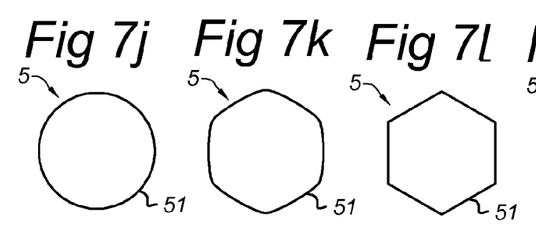
Figures 7M, 7N:
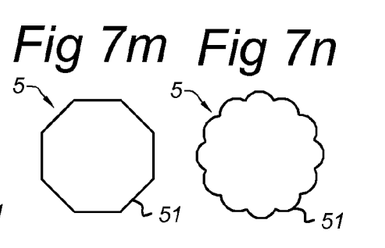
Figure 7P:
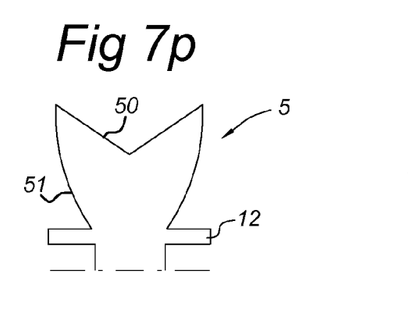
Figure 7Q:
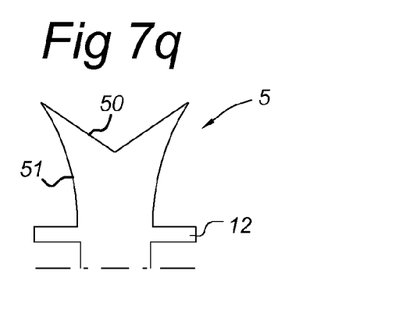

FIG. 7a-FIG. 7q shows details of various embodiments of a coupling element 5.

FIG. 7a shows a coupling element 5 with straight, cylindrical walls 51 forming the transmissive surface 51, and an interior cone 50 forming the reflective surface 50. The coupling element has a diameter $D_o$. The interior cone 50 has a depth $H_2$. Although such coupling element may be usable in embodiments, it may have a disadvantage in that, when the interior cone is relatively deep (i.e., has a relatively large depth $H_2$ relative to the diameter $D_0$) so as to reflect most light out of the coupling element 5, a significant amount of light may typically be directed into an angular range that cannot be captured by a reflector effectively, as light rays guided at a very skew angle relative to the reflective surface 50 are reflected in a very forward direction, and will thus also leave the coupling element 5 at low angles, i.e. in an almost forward direction. A significant fraction of this forwardly emitted light cannot be captured by a reflector 6 of a practical height and it cannot be controlled into a tight beam anymore. Also, a significant amount of the light may not get emitted by the coupling element 5, but gets sent back into the light guide 3, especially when the interior cone is relatively shallow (i.e., has a relatively small depth $H_2$ relative to the diameter $D_o$). This may cause a loss of efficiency and a relatively low light output of the system.

FIG. 7b and FIG. 7c schematically show a coupling element 5 with tapered sidewalls 51 forming the transmissive surface 51, and an interior cone 50 forming the reflective surface 50. FIG. 7b shows a longitudinal cross section. FIG. 7c shows a 3-dimensional view. The coupling element 5 has a first diameter $D_1$ near its position of contact with the guiding section 32 and a second diameter $D_2$ at its upper end, whereby the tapered sidewall 51 is inclined relative to the optical axis of the coupling element with an angle $\beta1$. The coupling element 51 has a height $H_1$. The interior cone forming the reflective surface 50 has a depth $H_2$. The reflective surface 50 is thus inclined at an angle $\beta2$ relative to a perpendicular end surface, i.e. at an angle of $90°-\beta2$ relative to the optical axis of the coupling element. Such coupling element does not have the problems associated with the a coupling element with straight, cylindrical walls. The amount of light in the forward direction may be negligible and the efficiency may be much higher: substantially all light is directed to and received by the reflector 6. The dimensions of the coupling element 5, which have found to be most efficient are such that the height $H_1$ is 80-120% of the top diameter $D_2$, for instance 25 mm, and the bottom diameter $D_1$ is approximately 40-70% of the top diameter $D_2$, for instance 13 mm. The depth $H_2$ may in particular be 15-65% of the top diameter $D_2$.

An exemplary coupling element 5 has a tapered sidewall having first diameter $D_1$ near its position of contact with the guiding section 32 of approximately $D_1=12$ mm, and second diameter $D_2$ at its upper end of approximately $D_2=25$ mm. The height $H_1$ of the coupling element 5 is approximately $H_1=25$ mm, and the depth $H_2$ of the interior cone forming the reflective surface 50 is $H_2=7$ mm, i.e. with the angle $\beta2$ being approximately 29°. The exemplary coupling element 5 may be used with a reflector 6 having a diameter $D_R$ of 110 mm and a height $H_R$ of 35 mm and having a substantially parabolic shape. The coupling element 5 may thus be arranged to reflect substantially all light to the reflector 6.

The sides 51 of the coupling element 5 do not need to be straight. A slight curvature may be advantageous for improving the system performance slightly.

In FIG. 7a-FIG. 7c, the reflective surface 50 has been described as being formed by an interior cone. Alternative shapes may also be used with similar sizes and ratios. Embodiments of the reflective surface 50 may be described as having a depth $H_2$, a cross-sectional shape and a longitudinal shape. The depth $H_2$, the cross-sectional shape and the longitudinal shape are designed together with the shape of the transmissive surface and the first diameter $D_1$, second diameter $D_2$ and height $H_1$ of the coupling element 5 to result in a relatively high efficiency of coupling light out of the coupling element 5 to the reflector 6 and in a relatively low amount of light being reflected back towards the guiding section 32. The cross-sectional shape of the reflective surface 50 may e.g. be circular, elliptical, triangular, square, hexagonal, another suitable polygon-shape, or any other suitable shape, e.g. a polygon-shape with rounded corners. The longitudinal section of the reflective surface 50 may e.g. be triangular (which, combined with a circular cross-sectional shape, forms in an interior cone), parabolic, or otherwise slightly concave or convex.

Examples are shown in FIG. 7d-FIG. 7i. FIG. 7d shows a cross-section along VIId (FIG. 7b) of an exemplary embodiment wherein the reflective surface 50 is formed as an interior cone with a circular base, corresponding to the example shown in FIG. 7c. FIG. 7e shows a cross-section of another exemplary embodiment wherein the reflective surface 50 is formed as an interior pyramid with a square base. FIG. 7f shows a longitudinal section of a coupling element with a relatively shallow interior cone with a reflective surface having a triangular longitudinal section. FIG. 7g shows a longitudinal section of a coupling element with a reflective surface having a concave longitudinal section. FIG. 7h shows a longitudinal section of a coupling element with a reflective surface having a convex longitudinal section. FIG. 7i shows a longitudinal section of a coupling element with a relatively deep interior cone with a reflective surface having a triangular longitudinal section.

In FIG. 7b-FIG. 7c, the transmissive surface 51 has been described as being formed by a tapered sidewall with a circular circumference. Alternative shapes may also be used with similar sizes and ratios. The circumference of the sidewall forming the transmissive surface 51 may e.g. be circular, elliptical, triangular, square, hexagonal, another suitable polygon-shape, or any other suitable shape, e.g. a polygon-shape with rounded corners. Examples are shown in FIGS. 7j-7n, which schematically indicate coupling elements with a circular sidewall, a hexagonal sidewall with rounded corners, a hexagonal sidewall, an octagonal sidewall and a facetted sidewall with 12 convex shaped facets, respectively. Embodiments of the transmissive surface 51 may be described as having a first diameter $D_1$ near its position of contact with the guiding section 32 and a second diameter $D_2$ at its upper end, wherein the second diameter $D_2$ is larger than the first diameter $D_1$ and the diameter of the transmissive surface 51 increases from the position of contact with the guiding section 32 to the upper end. Herein, the term diameter may refer to a suitable measure indicating the cross-sectional dimension the transmissive surface 51, such as a diameter of a circle when the transmissive surface has a circular circumference, a length of a side of a square when the transmissive surface has a square circumference, or a length of a long axis of a hexagonal circumference. The increase may be a linear increase: a circular cross-section combined with a linear increase results in a conically tapered sidewall; a square cross-section combined with a linear increase results in a pyramidically tapered sidewall. The increase may alternatively correspond to a convex or concave transmissive surface, e.g. corresponding to a partially parabolic shape. FIG. 7p shows an example of a convex transmissive surface. FIG. 7q shows another example, having a concave transmissive surface.

The coupling element 5 as schematically shown in FIGS. 7a-7q could be described in general terms as comprising a reflective surface 50 and a transmissive surface 51, the reflective surface 50 being arranged to reflect guided light inside the coupling element 5 towards the transmissive surface 51, and the transmissive surface 51 being arranged to transmit the reflected light out of the coupling element 5 towards the reflector 6. The coupling element 5 comprises a sidewall 51 extending along a downstream direction from the guiding section 32 towards the reflective surface 50, the sidewall 51 comprising the transmissive surface 51. The sidewall 51 may be tapered having an increasing diameter along a downstream direction from the guiding section 32 towards the reflective surface 50, as shown e.g. in FIG. 7b. In particular, the tapered sidewall may have a conical shape. The coupling element 5 may comprise a depression 50 in a downstream end of the light guide 3, the depression 50 comprising the reflective surface 50. The depression 50 may have a decreasing diameter along an upstream direction from the downstream end towards the guiding section. In other words, the depression 50 may be tapered inward into the coupling element 5. In particular, the depression 50 may be provided as an interior cone in the coupling element 5. The coupling element 5 may be formed as a solid, transparent body, either integrally with the guiding section 32, or as a separate part connected to the guiding section 32. The reflective surface 51 may be coated with a reflective layer.

Embodiments of the coupling element 5 as schematically shown in FIGS. 7a-7q could alternatively be described in general terms as a solid, transparent body having an entrance plane arranged for allowing the light guided through the guiding section 32 to enter the coupling element 5. A sidewall extends in a substantially downstream direction from the entrance plane to a shaped top surface. The cross-sectional dimension of the coupling element may be substantially constant along the downstream direction, as shown e.g. in FIG. 7a. Preferably, the cross-sectional dimension increases along the downstream direction, as shown e.g. in FIG. 7b. For example, when the cross-section is circular, its diameter may increase from a first diameter $D_1$ at the entrance plane to a second diameter $D_2$ at the shaped top surface. The increase may be substantially linear: the sidewall then corresponds to a surface of revolution formed by rotation a segment of a straight line around the coupling axis 9, wherein the segment is at an angle $\beta_1$ relative to the coupling axis (refer to FIG. 7b). The increase may alternatively e.g. correspond to a slightly convex surface: the sidewall then corresponds to a surface of revolution formed by rotation a convex line segment around the coupling axis. At least part of the sidewall forms a transmissive surface 51 for allowing light to be coupled out of the coupling element to illuminate the reflector 6. The shaped top surface extends back from the sidewall in an upstream direction towards the entrance plane with a decreasing cross-sectional dimension along the upstream direction, and thus forms an inward tapered surface. The inward tapered surface may correspond to a surface of a cone, i.e., correspond to a surface of revolution formed by rotation of a straight line segment around the coupling axis, wherein the line segments intersects the coupling axis at an angle $\beta_2$. The inward tapered surface may alternatively correspond to a surface of revolution formed by rotation of a curved line segment around the coupling axis, wherein the curved line segments intersects the coupling axis. The curved line segment may e.g. curved inward (concave) or curve outward (convex). At least part of the shaped top surface forms a reflective surface 50 for allowing guided light to be reflected inside the coupling element 5 towards the transmissible surface 51.

Figure 8A:
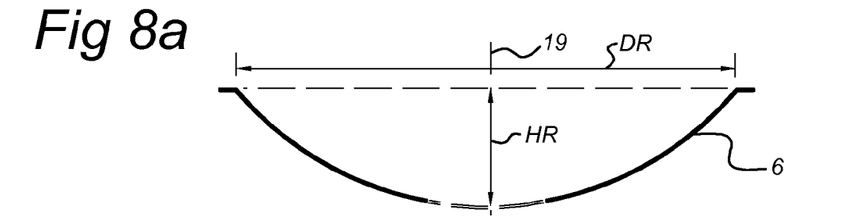
FIG. 8a-FIG. 8c schematically show embodiments of a reflector suitable for embodiments of the invention.
Figures 8B, 8C:
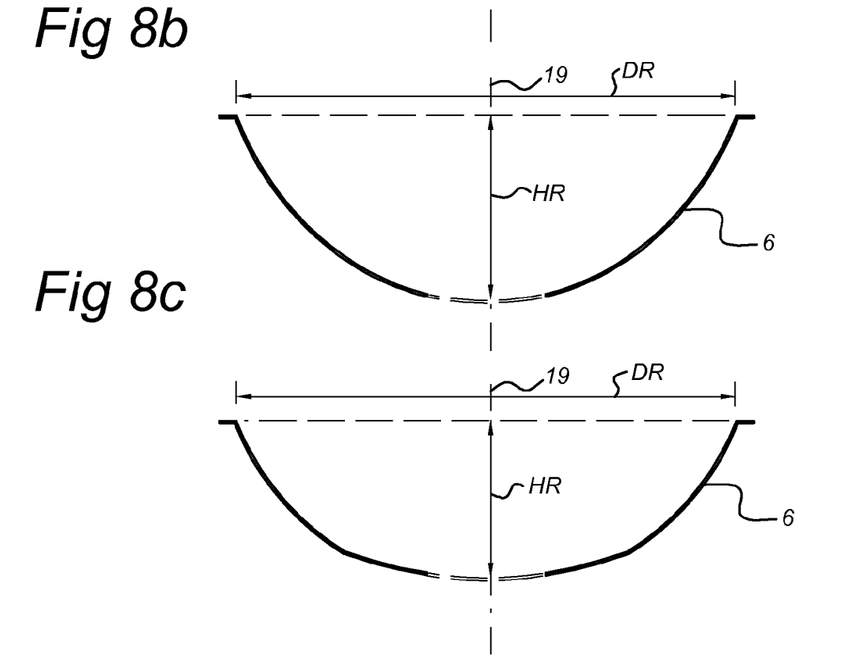

FIG. 8a-FIG. 8c schematically show embodiments of a reflector 6 suitable for embodiments of the invention.

FIG. 8a shows an exemplary reflector 6 having a substantially parabolic shape. The reflector 6 has a diameter $D_R$ of 110 mm and a height $H_R$ of 35 mm, and is suitable for use with the exemplary coupling element 5 described with reference to FIG. 7b.

FIG. 8a-FIG. 8c show some variations of the reflector shape. FIG. 8a shows a reflector 6 that creates a narrow beam when used with the coupling element as described before. FIG. 8b shows a reflector 6 that creates a wider beam, where the light emitted by opposite sides of the reflector cross each other. FIG. 8c shows a reflector 6 that creates a wide, divergent beam. The shape of the reflector 6 of FIG. 8c differs from that of FIG. 8a in that its height $H_R$ is lower and its curvature is different.

The reflector 6 may have a circular cross-section. The reflector 6 may alternatively have, e.g., a hexagonal cross-section, or any other alternative suitable shapes designed to achieve a certain beam width and beam shape. The reflector 6 may in particular be facetted, which may be advantageous in terms of color mixing and/or for aesthetical reasons. The shape of the reflector 6 may cooperate with the shape of the coupling element 5 to provide some additional color mixing and/or beam control.

The reflector 6 has a reflector axis 19. The reflector axis 19 may substantially correspond to the coupling axis 9 and may further correspond to the optical axis of the beam 20. The reflector 6 may be movable along the reflector axis 19.

Figure 9A:
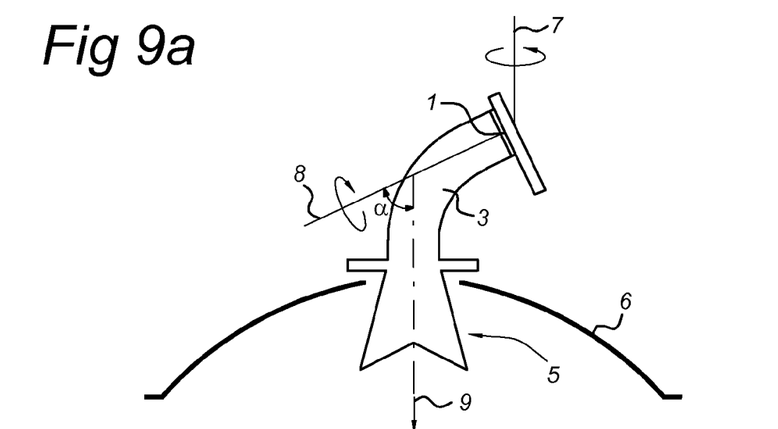
FIG. 9a and FIG. 9b show another alternative embodiment of a LED lighting system according to the invention.
Figure 9B:
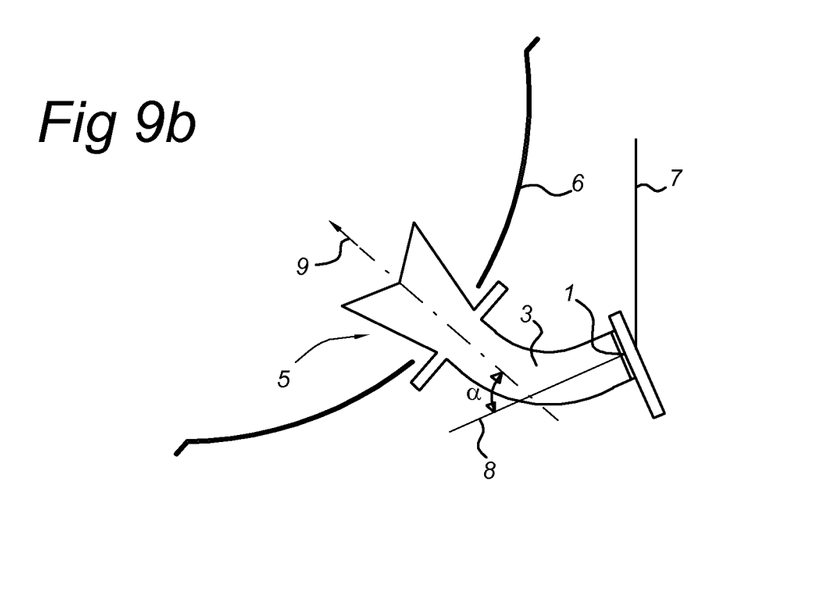

FIG. 9a-FIG. 9b show an alternative embodiment wherein a: different, i.e. non-perpendicular, angle is provided between the entrance axis 8 (coinciding with the optical axis of the LED light source 1) and the light beam axis 9. To that end, the at least one bend is arranged to orient the light beam axis 9 at an angle α relative to the entrance axis, wherein the a angle α is larger than 30 degrees, preferably larger than 45 degrees, more preferably larger than 60 degrees. Moreover, the entrance axis 8 is at a non-perpendicular angle to the vertical axis 7. In the example shown, the angle is about 60 degrees. It will be appreciated that other angles may be used in alternative embodiments, e.g. an angle larger than 30 degrees, or larger than 45 degrees, or even larger than 60 degrees may be used depending on e.g. requirements relating to the type of use of the system. Improved color mixing compared to using a straight mixing rod may be obtained when the at least one bend is arrange such that any light ray entering the light guide 3 though the entrance surface 2, is reflected at least once inside the guiding section 32, in particular inside the at least one bend.

The LED light source 1 and the optical system with light guide 3 and reflector 6, are jointly rotatable about the vertical axis 7.

The possible advantage of such a solution is that it limits the angular range that the beam can be aimed at. For instance, the light beam axis 9 of the light beam delivered by the system in FIG. 9a and FIG. 9b could never be pointed completely upwards by rotating about axes 7 or 8. This may be advantageous e.g. for aesthetic reasons, or when safety requirements do not allow that the light beam is pointing upwards. Also, in some applications, the upward direction will never be required and this limitation may be acceptable without any problem for a user; e.g. a spot mounted at a small distance under a ceiling would seldom need to be pointed upwards. For a spot, with a configuration as shown in FIG. 9a and FIG. 9b with a non-perpendicular angle between optical axis 8 and light beam axis 9, changing the beam direction may be more intuitive for a user than with a perpendicular angle, i.e. with an angle of substantially 90 degrees.

Figure 10:
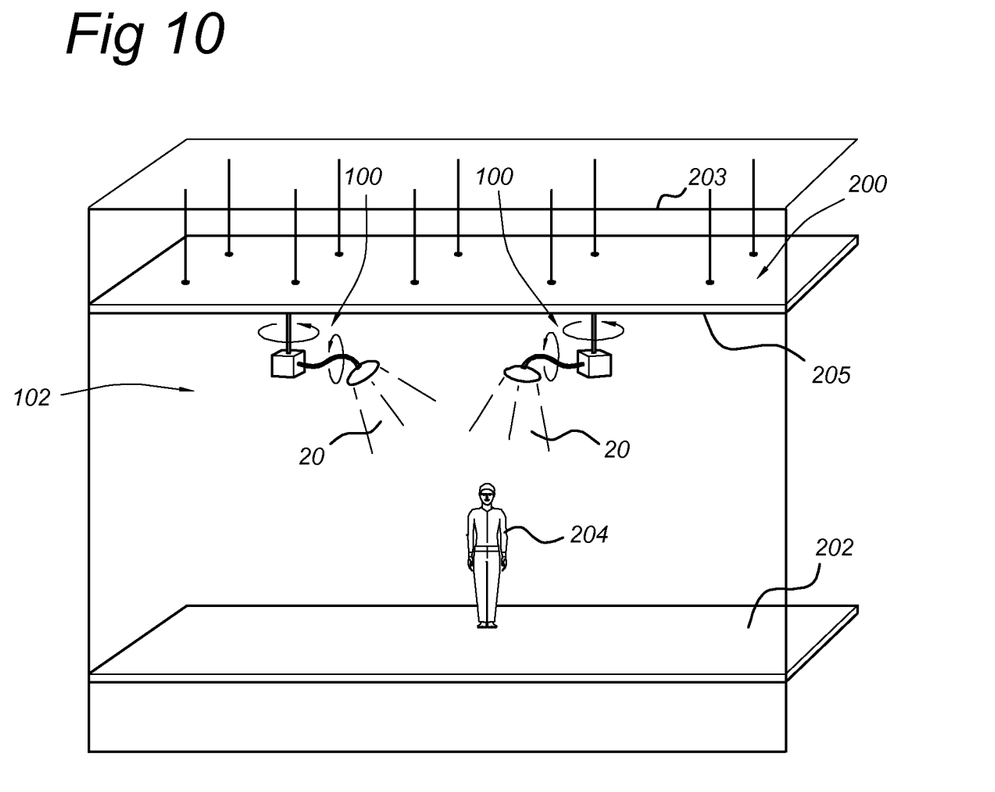
FIG. 10 shows a stage lighting system according to the invention.

FIG. 10 shows a theater 200 equipped with a stage lighting system 102 according to the invention. The stage lighting system 102 comprises a plurality of LED lighting systems 100 according to embodiments of the invention. The LED lighting systems 100 are mounted on a frame 205 which is suspended from a ceiling 203. The LED lighting systems 100 are controlled, e.g. using a DMX-controller, to orient their respective light beams to an object on the stage floor 202, such as an actor 204. The LED lighting systems 100 are further controlled by a lighting operator to change the color of their respective light beams 20. The LED lighting systems 100 may be equipped with a plurality of differently shaped reflectors 6, or with a shapeable reflector 6, to allow the lighting operator to also change the degree of divergence of one or more of the plurality of LED lighting systems 100.

Figure 11:
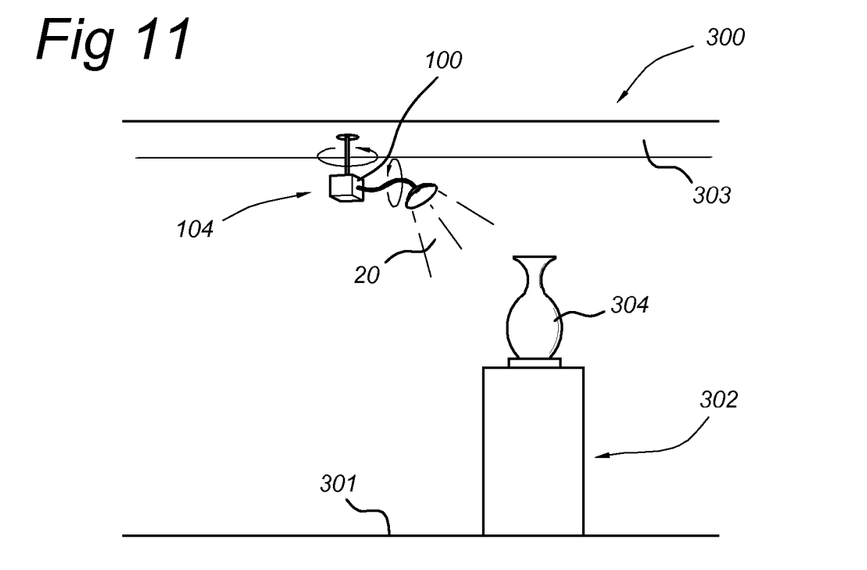
FIG. 11 shows a shop lighting system according to the invention.

FIG. 11 shows an area 300 of a shop equipped with a shop lighting system 104 according to the invention. The shop lighting system 104 comprises at least one LED lighting systems 100 according to embodiments of the invention. The LED lighting systems 100 are suspended from a shop ceiling 303. The LED lighting systems 100 are arranged by a shop keeper to direct their respective light beams 20 to an exhibit 302 displaying an object 304. The shop keeper may further choose the colors of the respective light beams of the at least one LED lighting systems 100.

Figure 12:
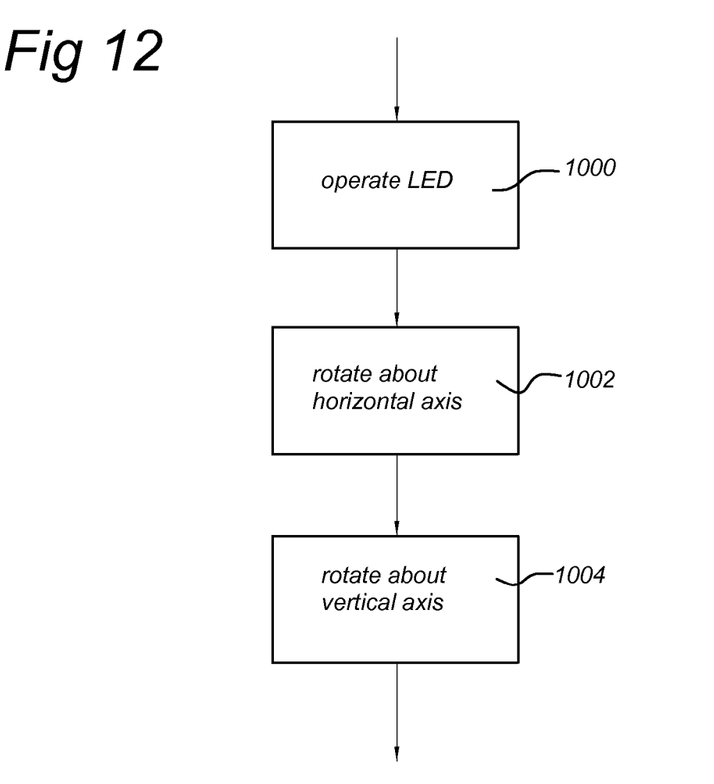
FIG. 12 shows an embodiment of a method according to the invention.

FIG. 12 shows an embodiment of a method according to the invention. The method provides a light beam using a LED lighting system according to an embodiment of the invention.

The method operates, in a first action 1000, the LED light source to provide incident light to the entrance surface of the optical system of the LED lighting system. The LED lighting system thereby provides a light beam, from guiding the incident light, mixing the incident light to obtain a uniformly colored beam in the light guide 3, coupling the light out of the light guide 3 with the coupling element 5 towards the reflector 6, where the light is reflected to form the light beam.

The method then orients the light beam with a first degree of freedom by a second action 1002 of rotatably orienting the optical system about the entrance axis, wherein the entrance axis is in a horizontal plane. This defines the inclination of the light beam relative to the horizontal plane.

The method further orients the light beam with a second degree of freedom by a third action 1004 of rotatably orienting the LED light source and the optical system about the system rotation axis, wherein the system rotation axis is vertical. This allows to direct the light beam e.g. to an object that the user wants to be illuminated. The heat sink, in thermal communication with the LED diodes of the LED light source, is maintained in an upright position during the rotation about the vertical axis.

It will be appreciated that the order of the actions 1000, 1002 and 1004 may be different, and/or one or more of actions 1000, 1002, 1004 may be repeated, and/or second action 1002 or third action 1004 may be absent in embodiments.

The skilled person will appreciate that embodiments and examples may be used in isolation or combined to obtain an optical system and/or a LED lighting system with at least one of the following advantages:
- alternative to known systems,
- good color mixing,
- less-complicated heat sink design as the heat sink only needs to be able to rotate around a single axis,
- easy support for providing different beam widths, as only the reflector needs to be exchanged,
- high efficiency,
- large freedom of technical design and/or
- large freedom of aesthetical design.

The invention claimed is:

1. A LED lighting system comprising a LED light source and an optical system, the optical system comprising a light guide and a reflector,
   a) the light guide being arranged for transporting light from a first end to a second end of the light guide, the light guide comprising:
      (i) an entrance surface arranged at the first end for allowing incident light provided, during use, from at least two LED diodes of a LED light source, to enter the light guide at an entrance axis,
      (ii) a coupling element arranged at the second end for coupling light out of the light guide at a coupling axis for illuminating the reflector, and (iii) a rod-like guiding section for guiding at least part of the light entered in the light guide from the first end to the coupling element, wherein (iv) the rod-like guiding section having at least one bend arranged such that each light ray of the light guided to the coupling element is reflected at least once in the at least one bend, and wherein (v) the at least one bend being arranged to orient the beam axis at an angle relative to the entrance axis; and b) the reflector being arranged to receive at least part of the light coupled out of the light guide and to reflect the received light for providing a directed beam at a beam axis, wherein the LED light source being arranged to provide the incident light to the entrance surface, and wherein the optical system being rotatable about the entrance axis.

2. The LED lighting system according to claim 1, wherein the angle is substantially 90 degrees.

3. The LED lighting system according to claim 1, wherein the rod-like guiding section has at least two bends, the two bends being in opposite direction in a single plane.

4. The LED lighting system according to claim 1, wherein the light guide is integrally formed.

5. The LED lighting system according to claim 1, wherein the guiding section and the coupling element are individual components, the coupling element being in optical communication with the guiding section.

6. The LED lighting system according to claim 1, wherein the reflector has a reflector axis substantially corresponding to the coupling axis.

7. The LED lighting system according to claim 1, wherein the reflector is removably provided in the optical system.

8. The LED lighting system according to claim 1, wherein the reflector is movable relative to the coupling element.

9. The LED lighting system according to claim 1, wherein
the coupling element comprises a reflective surface and a transmissive surface,
the reflective surface being arranged to reflect guided light inside the coupling element towards the transmissive surface, and
the transmissive surface being arranged to transmit the reflected light out of the coupling element towards the reflector.

10. The LED lighting system according to claim 9, wherein the coupling element comprises a tapered sidewall with increasing cross-sectional dimension along a downstream direction from the guiding section towards the reflective surface, the sidewall comprising the transmissive surface.

11. The LED lighting system according to claim 9, wherein the coupling element comprises an inwardly tapered depression with decreasing cross-sectional dimension along an upstream direction towards the guiding section, the depression comprising the reflective surface.

12. The LED lighting system according to claim 1, wherein the guiding section has a cross-section comprising corners, preferably a square, rectangular, or hexagonal cross-section.

13. The LED lighting system according to claim 1, wherein the guiding section has a first cross-section at a first position along its length and a second cross-section at a second position along its length, the second position being different from the first position and the second cross-section being different from the first cross-section.

14. The LED lighting system according to claim 1, wherein the LED light source and the optical system are together rotatable about a system rotation axis, the system rotation axis being at an angle to the entrance axis.

15. The LED lighting system according to claim 1, wherein the LED lighting system further comprises a heat sink in thermal communication with the LED light source for conducting heat away from the LED light source during use.

16. The LED lighting system according to claim 15, wherein the heat sink is designed to be, during use, oriented in a predetermined orientation and to maintain the predetermined orientation during rotation of the optical system.

17. A stage lighting system comprising at least one LED lighting system according to claim 1.

18. A shop lighting system comprising at least one LED lighting system according to claim 1.

19. The LED lighting system according to claim 1, wherein the optical system being rotatable relative to the LED light source.

20. The LED lighting system according to claim 1, wherein the optical system and the LED light source are rotatable together relative to a common mount.

* * * * *